(12) United States Patent
Hankins et al.

(10) Patent No.: US 6,240,893 B1
(45) Date of Patent: Jun. 5, 2001

(54) MOUNTING BRACKET ASSEMBLY

(75) Inventors: Lynn Hankins; Fred Tuffly, both of Mesa, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

(21) Appl. No.: 09/437,907

(22) Filed: Nov. 9, 1999

(51) Int. Cl.[7] ........................................... F16H 7/08
(52) U.S. Cl. ................................................ 123/195 A
(58) Field of Search .......................... 123/195 A, 198 R; 474/101, 133, 135; 248/125.2, 222.51

(56) References Cited

U.S. PATENT DOCUMENTS

| | | | |
|---|---|---|---|
| 2,909,074 | * | 10/1957 | Scheiterlein ................ 74/242.16 |
| 3,730,147 | * | 5/1973 | Buchwald ..................... 123/198 R |
| 3,922,927 | * | 12/1975 | Shiki et al. ................... 74/242.13 R |
| 4,512,752 | * | 4/1985 | Brenneman ..................... 474/114 |
| 4,571,221 | * | 2/1986 | Isobe et al. ..................... 474/101 |
| 4,726,557 | * | 2/1988 | Heurich et al. ................. 248/666 |
| 4,877,984 | * | 10/1989 | Colwell et al. ................. 310/66 |
| 4,887,992 | * | 12/1989 | Dixon ............................. 477/101 |
| 4,980,589 | * | 12/1990 | Ochi et al. ...................... 310/68 |
| 5,065,713 | * | 11/1991 | Seats ............................. 123/195 |
| 5,125,376 | * | 6/1992 | Williams et al. .............. 123/195 |
| 5,705,870 | * | 1/1998 | Thomsen et al. ............... 310/91 |

* cited by examiner

*Primary Examiner*—Willis R. Wolfe
*Assistant Examiner*—Hyde R Ali
(74) *Attorney, Agent, or Firm*—Rod S. Berman; Jeffer, Mangels, Butler & Marmaro LLP

(57) ABSTRACT

A mounting bracket assembly in the engine compartment of a moving vehicle is provided. The assembly includes an object to be tensioned, a movable tension adjuster that when moved exerts a tensioning force and a fixed surface. Moving the tension adjuster against the fixed surface causes the object to be tensioned.

20 Claims, 2 Drawing Sheets

MOUNTING BRACKET ASSEMBLY

FIELD OF THE INVENTION

The present invention relates to brackets for mounting engine components and tensioning engine belts.

BACKGROUND OF THE INVENTION

Mounting brackets in truck engines must be rigid and durable in order to withstand the conditions to which they are subjected over the life of the engine. Engine vibrations and the weight of the rigid objects attached to the brackets cause the brackets to fatigue. Conventional engine component mounting brackets often suffer premature failure due to the fatigue caused by these harsh conditions.

Mounting brackets that are used to mount components such as air/vacuum pumps and the like often are slotted for tensioning engine belts. To tension the belts of such components leverage must be placed on the mounting bracket to which the component is affixed to move the bracket and component in a direction which will cause the belt to be tensioned. However, when tensioning the belt, it is often difficult for the user to place any leverage on the bracket due to the substantially planar construction of the prior art brackets. A pry bar or other extended lever are often used to place a force on the bracket to move the bracket and tension the belt. Use of an extraneous lever can be awkward and often is difficult to maneuver in the confines of the engine compartment and hold the belt tight while retightening the bolt(s) to hold the bracket in place. Examples of mounting brackets and tensioning devices are shown in U.S. Pat. No. 5,065,713 to Seats, No. 4,877,984 to Colwell et al., No. 4,980,589 to Ochi et al., No. 5,705,870 to Thomsen et al., No. 4,726,557 to Heurich et al., No. 2,909,074 to Scheiterlein and No. 5,125,376 to Williams et al. However, the devices taught in these patents are either simply mounting brackets or tensioning devices. None of them perform both functions without the use of an outside implement, such as a pry bar.

A long felt need exists for engine mounting brackets that are durable and provide a simplified belt tensioning function that does not require extraneous components such as a pry bar.

SUMMARY OF THE PREFERRED EMBODIMENTS

In accordance with one aspect of the present invention there is provided a mounting bracket assembly in the engine compartment of a moving vehicle. The assembly includes an object to be tensioned, a movable tension adjuster that when moved exerts a tensioning force and a fixed surface. Moving the tension adjuster against the fixed surface causes the object to be tensioned.

In accordance with another aspect of the present invention there is provided a mounting bracket assembly that includes first and second brackets mountable to an object and a tension adjuster. The first bracket includes a tensioning flange extending therefrom and at least one tensioning slot defined therein. The tension adjuster extends from the second bracket to the tensioning flange of the first bracket.

In accordance with another aspect of the present invention there is provided a bracket for mounting engine components. The bracket includes a main body portion and a tensioning flange extending from the main body portion. The main body portion has defined therein at least one mounting hole, and a tensioning slot.

In accordance with yet another aspect of the present invention there is provided a bracket for mounting engine components. The bracket includes a first wall having defined therein at least one mounting hole and a second wall extending from the first wall. The second wall has defined therein a tensioning opening adapted to receive a tension adjuster.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
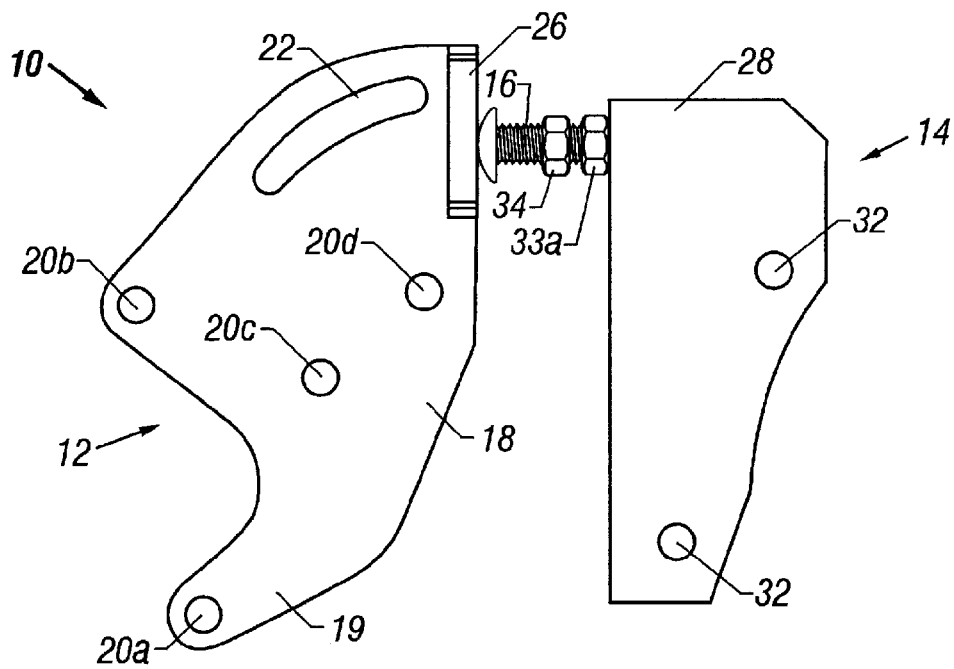
FIG. 1 is a front elevation of a mounting bracket assembly showing first and second mounting brackets and a threaded tension adjuster in accordance with a preferred embodiment of the present invention.

Referring to FIGS. 1–5, a preferred embodiment of a mounting bracket assembly 10 for mounting and/or tensioning vehicle engine components or belts is shown. Mounting bracket assembly 10 generally includes a first mounting bracket 12, a second mounting bracket 14 and a threaded tension adjuster 16.

It will be appreciated that terms such as "front," "rearwardly," and "forwardly" used hereinbelow are merely for ease of description and refer to the orientation of the components as shown in the Figures. It should be understood that any orientation of mounting bracket assembly 10 described herein is within the scope of the present invention.

For exemplary purposes only, described hereinbelow is a preferred embodiment wherein first mounting bracket 12 is provided for mounting an air/vacuum pump 66 and tensioning an air/vacuum pump belt 60, wherein the second mounting bracket 14 is mounted to a water pump and provides a fixed mounting point for the air/vacuum pump belt-tension adjustment screw (threaded tension adjuster 16). It will be understood, however, that mounting bracket assembly 10 can be used to mount other engine components as desired. The engine 68, and engine components are all conventional and need only be described to enable a complete understanding of the invention. It will be understood that the mounting bracket assembly described herein can be used to mount components and/or tension belts other than those in an engine.

First mounting bracket 12 includes a main body portion 18 that is preferably substantially flat, and has defined therein a plurality of mounting holes 20a, 20b, 20c, and 20d running transversely therethrough, as shown in FIG. 1. It should be understood that main body portion 18 can contain any number of mounting holes 20. Mounting holes 20a, 20b and 20c are provided for mounting the air/vacuum pump 60 (via the air/vacuum pump mounting ears 62) to first mounting bracket 12. Main body portion 18 includes an ear 19, the end of which has mounting hole 20a formed therein.

Main body portion 18 also has defined therein a tensioning slot 22. Tensioning slot 22 is preferably arcuately shaped. However, tensioning slot 22 can also be straight. Alternatively, main body portion 18 can include a plurality of parallel tensioning slots. A threaded bolt 24, with washer 24a engages tensioning slot 22. In operation, for tensioning purposes, bolt 24 can be loosened and the first mounting bracket 12 can be slid, relative to bolt 24 and washer 24a, along tensioning slot 22. The belt tensioning function is described more fully herein below.

The shape of main body portion 18 is not a limitation on the present invention and is dependent on the configuration of the component(s) which are to be mounted by first mounting bracket 12.

Figure 2:
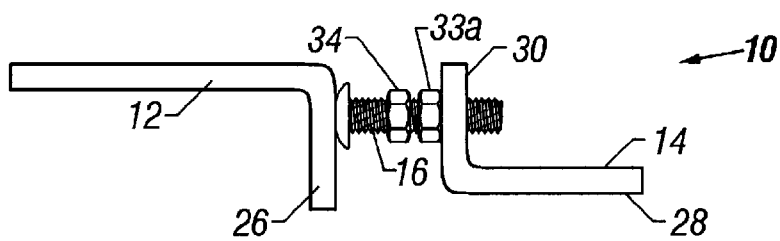
FIG. 2 is a top plan view of the mounting bracket assembly of FIG. 1.
Figure 3:
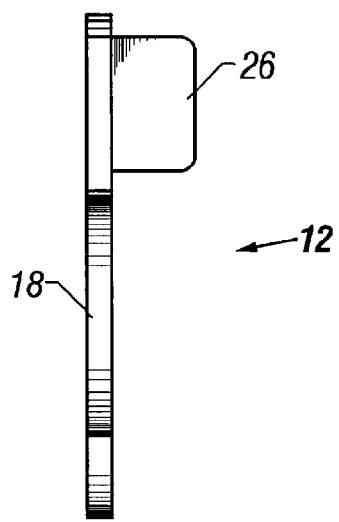
FIG. 3 is a left side elevation of the first mounting bracket of FIG. 1.
Figure 4:
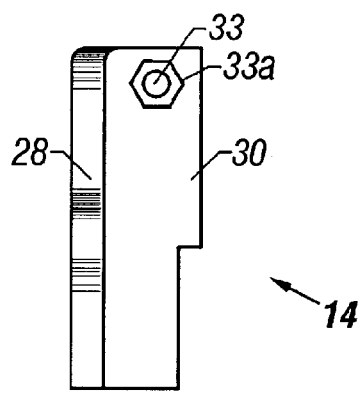
FIG. 4 is a right side elevation of the second mounting bracket of FIG. 1.
Figure 5:
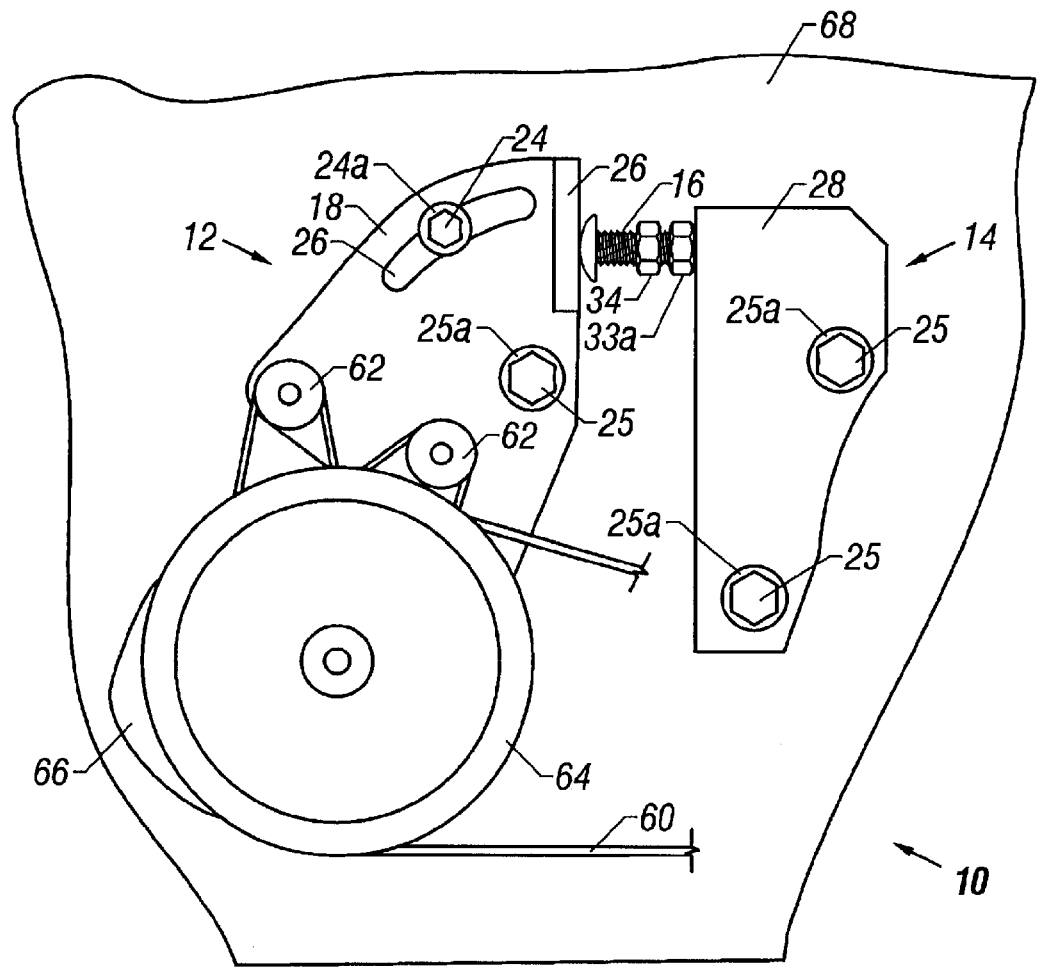
FIG. 5 is a front elevation of an invention including the mounting bracket assembly of FIG. 1 with an air/vacuum pump, air/vacuum pump pulley and belt affixed thereto.

A tensioning flange 26, preferably located adjacent tensioning slot 22, as shown in FIG. 1, extends forwardly from said main body portion 18. In a preferred embodiment, tensioning flange 26 extends from main body portion 18 at a substantially right angle, as shown in FIG. 2. As shown in FIG. 3, tensioning flange 26 is substantially rectangular. However, any geometrically shaped tensioning flange is within the scope of the present invention.

Second mounting bracket 14 includes a first wall 28 and a second wall 30 extending rearwardly (oppositely from tensioning flange 26, as described above), preferably at a substantially right angle, from said first wall 28. First wall 28 has a plurality of mounting holes 32 defined therein, as shown in FIG. 1. The placement of mounting holes 32 is dependent on the particular mounting configuration of second mounting bracket 14 and is not a limitation on the present invention. In an alternative embodiment, tensioning flange 26 of first mounting bracket 12 extends rearwardly, and second wall 30 of second mounting bracket 14 extends forwardly and is substantially parallel to tensioning flange 26.

Second wall 30 has a tensioning opening 33 defined therein. In a preferred embodiment, tensioning opening 33 includes a hole defined in second wall 30 and a nut 33a affixed (via welding or the like) to second wall 30 that is coaxial with the hole. In another embodiment, tensioning opening 33 can be a threaded hole defined near the top of second wall 30.

Preferably, first and second mounting brackets 12 and 14 are comprised of a rigid, durable metal, such as steel. Furthermore, first and second mounting brackets 12 and 14 can also be comprised of relatively thick metal, thereby preventing fatigue failure.

In a preferred embodiment, threaded tensioning adjuster 16 includes a nut 34 threaded thereon, and is threaded into tensioning opening 33 (including nut 33a). The nut 34 is provided for tightening and loosening threaded tension adjuster 16 as is known in the art.

In affixing mounting bracket assembly 10 to an engine 68, threaded fasteners 25 having a washer 25a thereon are slipped through mounting holes 20 and 32 in first and second mounting brackets 12 and 14, respectively. The fasteners 25 are threaded into corresponding holes in the engine components to which first and second mounting brackets 12 and 14 are being affixed. In a preferred embodiment, first mounting bracket 12 is affixed to an underlying mounting bracket that is already present in the engine, and second mounting bracket 14 is affixed to the engine water pump. Bolt 24 is then slipped into tensioning slot 22 and secured therein.

When first and second mounting brackets 12 and 14 are mounted, main body portion 18 of first mounting bracket 12 and first wall 28 of second mounting bracket 14 are preferably substantially parallel, as shown in FIG. 2. Tensioning flange 26 of first mounting bracket 12 and second wall 30 of second mounting bracket 14 are also preferably substantially parallel, thereby causing threaded tension adjuster 16 to extend from tensioning opening 33 perpendicularly toward tensioning flange 26.

The tensioning of air/vacuum pump belt 60 in accordance with the foregoing preferred embodiment will now be explained. First, bolt 24 and bolt 25 that is located in mounting hole 20d are loosened such that first mounting bracket 12 is movable relative to bolt 24, and pivotable about bolt 25 in mounting hole 20d. Nut 34 is loosened, thereby allowing threaded tension adjuster 16 to be turnable within tension opening 33. Threaded tension adjuster 16, the head of which is in contact with tensioning flange 26, is turned out, thereby causing first mounting bracket 12 to pivot about bolt 25 in hole 20d until air/vacuum pump belt 60 is tensioned as desired. Nut 34 is then retightened, thereby locking threaded tension adjuster 16 in place, which holds first mounting bracket 12 in the desired position, thereby maintaining the desired tension on air/vacuum pump belt 60.

The mounting bracket assembly 10 according to the present invention provides tensioning for engine belts without the use of outside leverage means, such as a pry bar.

In an alternative embodiment, the tension adjuster 16 can extend from the first mounting bracket 12 and to the second wall 30 of the second mounting bracket 14.

The embodiments of the present invention recited herein are intended to be merely exemplary and those skilled in the art will be able to make numerous modifications to them without departing from the spirit of the present invention. For example, the threads on threaded tension adjuster 16 can be omitted. The mounting brackets described herein can be used to mount any engine accessory, such as the air conditioning compressor, power steering, alternator, etc. All such modifications are intended to be within the scope of the present invention as defined by the claims appended hereto.

What is claimed is:

1. A mounting bracket assembly in the engine compartment of a moving vehicle, the assembly comprising:
    (a) an object to be tensioned,
    (b) a movable adjuster that when moved exerts a pushing force,
    (c) a first bracket mountable to a component, said first bracket including a flange extending therefrom and at least one slot defined in said first bracket, said adjuster abutting said flange to exert a pushing force, and
    wherein moving said adjuster against said flange causes said object to be tensioned.

2. The assembly of claim 1 further comprising:
    a second bracket mountable to a component,
    wherein said adjuster extends from said second bracket to said flange of said first bracket.

3. The assembly of claim 2 wherein said adjuster is threaded.

4. The assembly of claim 2 wherein said slot is arcuate.

5. The assembly of claim 1 wherein said first bracket comprises a main body portion, said main body portion having defined therein at least one hole and said slot, wherein said flange extends from said main body portion, and wherein when said adjuster is moved against said flange said first bracket pivots about said hole.

6. The assembly of claim 5 wherein said second bracket comprises a first wall, said first wall having defined therein at least one mounting hole and a second wall extending from said first wall, said second wall having defined therein an opening.

7. The assembly of claim 6 wherein said adjuster is engaged within said opening of said second bracket.

8. The assembly of claim 7 wherein said flange extends forwardly from said main body portion and said second wall extends rearwardly from said first wall.

9. The assembly of claim 5 wherein said main body portion of said first bracket has defined therein a plurality of mounting holes.

10. The assembly of claim 6 wherein said first wall of said second mounting bracket has defined therein a plurality of holes.

11. The assembly of claim 6 wherein said flange and said second wall are substantially parallel.

12. The assembly of claim 7 wherein said flange extends rearwardly from said main body portion and said second wall extends forwardly from said first wall.

13. The assembly of claim 7 wherein said flange extends rearwardly from said main body portion and said second wall extends rearwardly from said first wall.

14. The assembly of claim 7 wherein said flange extends forwardly from said main body portion and said second wall extends forwardly from said first wall.

15. The assembly of claim 5 wherein said flange extends from said main body portion at a substantially right angle.

16. The assembly of claim 5 wherein said at least one hole is remote from said slot.

17. An engine comprising:
 (a) the assembly of claim 1 secured to said engine,
 (b) a component affixed to said first bracket, said component including a pulley, and
 (c) a belt mounted on said pulley, said belt extending between said pulley and said engine.

18. The engine of claim 17 wherein said component is an air/vacuum pump.

19. A device for adjusting the tension of an engine belt, the device comprising:
 a) a first bracket, movable with respect to a second bracket, said first bracket having a slot defined therein,
 b) said second bracket disposed in a fixed relationship with respect to said belt,
 c) a moveable body associated with the first and second brackets, whereby movement of the moveable body moves said second bracket and said first bracket away from each other, thereby adjusting the tension of the engine belt.

20. The device of claim 19 wherein said movement of said second bracket is a pivoting movement, and wherein said slot is arcuate.

* * * * *